United States Patent
Krishnaprasad et al.

(10) Patent No.: US 7,644,066 B2
(45) Date of Patent: Jan. 5, 2010

(54) TECHNIQUES OF EFFICIENT XML META-DATA QUERY USING XML TABLE INDEX

(75) Inventors: Muralidhar Krishnaprasad, Fremont, CA (US); Zhen Hua Liu, San Mateo, CA (US); Hui Joe Chang, Fremont, CA (US); Vikas Arora, San Francisco, CA (US); Susan M. Kotsovolos, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 238 days.

(21) Appl. No.: 11/394,878

(22) Filed: Mar. 31, 2006

(65) Prior Publication Data

US 2007/0239681 A1    Oct. 11, 2007

(51) Int. Cl.
*G06F 17/30* (2006.01)
(52) U.S. Cl. ......................................................... 707/3
(58) Field of Classification Search ........................ None
See application file for complete search history.

(56) References Cited

U.S. PATENT DOCUMENTS

| | | | |
|---|---|---|---|
| 5,546,579 A | 8/1996 | Josten et al. | |
| 5,745,904 A | 4/1998 | King | |
| 6,366,934 B1 * | 4/2002 | Cheng et al. | 715/210 |
| 6,643,633 B2 | 11/2003 | Chau et al. | |
| 6,654,734 B1 | 11/2003 | Mani et al. | |
| 6,694,306 B1 | 2/2004 | Nishizawa et al. | |
| 6,708,186 B1 * | 3/2004 | Claborn et al. | 707/102 |
| 6,925,470 B1 * | 8/2005 | Sangudi et al. | 707/102 |
| 7,031,956 B1 | 4/2006 | Lee et al. | 707/3 |
| 7,146,365 B2 * | 12/2006 | Allen et al. | 707/8 |
| 7,315,852 B2 | 1/2008 | Balmin et al. | |
| 7,398,265 B2 | 7/2008 | Thusoo et al. | |
| 2001/0037345 A1 * | 11/2001 | Kiernan et al. | 707/513 |
| 2002/0073019 A1 | 6/2002 | Deaton | 705/38 |
| 2002/0078068 A1 | 6/2002 | Krishnaprasad et al. | |
| 2002/0116457 A1 | 8/2002 | Eshleman et al. | 709/203 |
| 2003/0101169 A1 | 5/2003 | Bhatt et al. | |
| 2003/0212664 A1 | 11/2003 | Breining et al. | |
| 2004/0034615 A1 | 2/2004 | Thomson et al. | |
| 2004/0148278 A1 | 7/2004 | Milo et al. | 707/3 |

(Continued)

OTHER PUBLICATIONS

U.S. Appl. No. 11/601,146, Filed: Nov. 17, 2006, Non-Final Office Action Correspondence Mailing Date: Jul. 22, 2009, 17 pgs.

(Continued)

*Primary Examiner*—Neveen Abel Jalil
*Assistant Examiner*—Kellye D Buckingham
(74) *Attorney, Agent, or Firm*—Hickman Palermo Truong & Becker LLP; Adam C. Stone

(57) ABSTRACT

XML table indexes provide a more efficient mechanism for searching data stored in aggregate form. XML table indexes are a set of tables created to project out in column form commonly sought metadata from stored XML documents. By projecting the data includes into column form, queries on the XML documents can be efficiently processed as they can leverage the enhanced functionality provided by the database tables. The XML table indexes may use aliases, partitioning, constraints and other functions to further improve query flexibility and performance.

42 Claims, 6 Drawing Sheets

U.S. PATENT DOCUMENTS

| | | |
|---|---|---|
| 2004/0163041 A1 | 8/2004 | Engel |
| 2004/0225724 A1 | 11/2004 | Pavlik et al. |
| 2004/0267760 A1 | 12/2004 | Brundage et al. ........... 707/100 |
| 2005/0091188 A1* | 4/2005 | Pal et al. ........................ 707/1 |
| 2005/0228792 A1 | 10/2005 | Chandrasekaran et al. |
| 2005/0289125 A1 | 12/2005 | Liu et al. ....................... 707/3 |
| 2006/0212420 A1 | 9/2006 | Murthy |

OTHER PUBLICATIONS

U.S. Appl. No. 11/728,650, Filed Mar. 26, 2007, Office Action Correspondence Mailing Date: Aug. 10, 2009, 73 pgs.

* cited by examiner

FIG. 1

```
<purchaseOrder>
        <reference>GHB3567</reference>
        <shipAddrCity>Oakland</shipAddrCity>
        <billAddrCity>Berkeley</billAddrCity>
        <lineItem itemNo = 34>
                <itemName>CPU</itemName>
                <itemQuantity>3</itemQuantity>
                <itemUnitPrice>123.45</itemUnit Price>
        </lineItem>
        <lineItem itemNo = 68>
                <itemName>Memory</itemName>
                <itemQuantity>3</itemQuantity>
                <itemUnitPrice>23.45</itemUnitPrice>
        </lineItem>
</purchaseOrder>
```

```
<purchaseOrder>
    <reference>GHB3567</reference>
    <shipAddrCity>Oakland</shipAddrCity>
    <billAddrCity>Berkeley</billAddrCity>
    <lineItem itemNo = 34>
        <itemName>CPU</itemName>
        <itemQuantity>3</itemQuantity>
        <itemUnitPrice>123.45</itemUnitPrice>
    </lineItem>
    <lineItem itemNo = 68>
        <itemName>Memory</itemName>
        <itemQuantity>3</itemQuantity>
        <itemUnitPrice>23.45</itemUnitPrice>
    </lineItem>
    <newLineItem itemNo = 34>
        <item><name>CPU2<name></item>
        <quantity>4<quantity>
        <fullprice><uprice>3 23.45</uprice>
        <tprice>1400.05</tprice></fullpri ce>
    </newLineItem>
</purchaseOrder>
```

```
<purchaseOrder>
        <reference>GHB3567</reference>
        <shipAddrCity>Oakland</shipAddrCity>
        <billAddrCity>Berkeley</billAddrCity>
        <lineItem itemNo = 34>
                <itemName>CPU</itemName>
                <itemQuantity>3</itemQuantity>
                <itemUnitPrice>123.45</itemUnitPrice>      510
                <DetailsCmt>comment1</DetailsCmt>
                <DetailsCmt>comment2</DetailsCmt>
        </lineItem>
        <lineItem itemNo = 68>
                <itemName>Memory</itemName>
                <itemQuantity>3</itemQuantity>
                <itemUnitPrice>23.45</itemUnitPrice>        520
                <DetailsCmt>comment3</DetailsCmt>
        </lineItem>
</purchaseOrder>
```

TECHNIQUES OF EFFICIENT XML META-DATA QUERY USING XML TABLE INDEX

BACKGROUND

Relational Database Management Systems ("DBMS") typically support a wide range of data types. For example, a DBMS allows users to store and query scalar data type values such as integers, numbers, and strings. Some DBMSs have the added ability to support more complex data types, for instance, the ability to support Extended Markup Language ("XML") documents and other XML type data. Those DBMSs that include XML support allow users to define tables, or columns in a table, as an XML type (e.g. as XML-Type). This added support facilitates the inclusion of more sophisticated data in DBMSs. However, with the addition of complex data types, new techniques had to be created to handle storage and access issues.

I. XML Type Storage Techniques

XML data does not naturally lend itself to conventional physical storage models in a DBMS. Thus, a variety of storage techniques can be used to manage the storage of such data. For example, two models for storing XML type data in a database include storing the data object-relationally or storing the data in aggregate form.

A. Object-Relational Storage

Storing XML type data object-relationally involves defining a complex database representation, defined in terms of data types, handled by the database system, referred to herein as database types, to represent XML documents. Database types include, for example, native database types, such as integer and VARCHAR ("variable length character string"), or object types defined for a database system using a DDL statements (data definition language statements).

Within a database representation of an XML document, various database objects are defined to represent and store elements and various components of an XML document. For example, each element of an XML document may be represented by a column in a table. A given XML document is stored in a row of the table. A particular element value of the XML document is stored in the row's column that represents the element.

Another example of a database representation is an object class defined by an object relational database system. Each object of the object is an instance of an object database system. An object that is an instance of the object class defines, for example, the structure corresponding to an element, and includes references or pointers to objects representing the immediate descendants of the element.

The underlying structures that comprise a database representation (e.g. table, object table, columns, object columns) are referred to as base database objects or structures. When an XML document is submitted to the DBMS for storage, it is shredded into element values, which are stored in corresponding components of the base structures. For example, an XML-based resume document would be shredded into various elements such as name, email, telephone number, work experience, and other elements. After the document is shredded, a new row is created in a resume table and each value from the shredded resume is placed in the column corresponding to the value's element.

In some instances, there may be multiple values for a particular type of element in a document. For example, a resume document has as an element "working history." Under this particular element type, the applicant has his previous jobs. In other words, the working history element consists of a list of jobs. In such a case, a separate table may be created for that particular type of element and a reference to the separate table is added to the resume table.

To further illustrate, consider, for example, the purchaseOrder document 100 in FIG. 1. The purchaseOrder document 100 is an example of an XML document that may be submitted to a database server. The purchaseOrder document 100 is an XML document that defines a purchase order with the following elements: Reference (reference number), ShipAddrCity (shipping address city), BillAddrCity (billing address city), and LineItems. A LineItem element has additional sub-elements of ItemName, ItemQuantity (e.g., 3 CPUs and 3 Memory chips), and ItemUnitPrice.

Assuming that each element in the purchaseOrder has a corresponding column in the table schema, the document shown in FIG. 1 may be shredded and placed in an object-relational table. The scalar values from the document are placed in the columns based on their element type. Table 2 illustrates an example of an object-relational table for purchaseOrder. Note that the table for purchaseOrder is an XML type table.

TABLE 1

Parent table for Purchase Order

| Purchase Order | Reference | ShipAddrCity | BillAddrCity | LineItem |
|---|---|---|---|---|
| Rid1 | GHB3567 | Oakland | Berkley | LineItem Table Ptr (e.g. LineItem Table at Rid1 and Rid) |

In Table 2, each value from the purchaseOrder document 100 is placed in a column based on its element type. For example, reference number "GHB3567" is placed in the reference column, shipping address city "Oakland" is placed in the ShipAddrCity column, etc. At a point during the shredding, the DBMS detects that multiple values are listed for lineItems. Accordingly, a second table is used to store the lineItems. A reference is added to the purchaseOrder table, which points the secondary lineItem table. Table 3 illustrates an example of the lineItem object-relational table for purchaseOrder document 100.

TABLE 2

Child table for Purchase Order

| LineItem | ItemNo | ItemName | ItemQuantity | ItemUnitPrice |
|---|---|---|---|---|
| Rid1 | 34 | CPU | 3 | 123.45 |
| Rid2 | 68 | Memory | 3 | 23.45 |

Unfortunately, many XML documents and other forms of complex data do not conform to any pre-defined schema. For instance, resumes typically include some common features such name, address, and telephone number, but they often also include features that are not necessarily included in every resume. Those less common features may include, for example, items such as hobbies, publications, internship data, research projects, and references. In an object-relational model, when the DBMS attempts to import an XML document that includes data that does not conform to the defined schema, the document (or at least important data in the document) may be ignored, deleted, dumped, etc. To address this problem, developers may attempt to create a column for every different type of element or feature that may possibly be submitted to the DBMS. This strategy, however, is not very practical, because even with their best efforts, database developers may not account for every potential variation on an element name or value type. Moreover, the more columns defined in the table, the more space each new row in the table consumes. When a new row is added, the DBMS typically allocates space for an entire row, whether data is placed in each column or not. This has the potential to waste a lot of space.

As an alternative, aggregate storage techniques, such as CLOBs and BLOBs, may be used to store XML type data.

B. Aggregate Storage (LOB-Based Storage)

In aggregate storage, a complex database representation is not used to represent a XML document. XML documents are stored in aggregate form in a LOB ("large binary object"), for example, CLOBs (Character Large Objects) and BLOBs (Binary Large Objects). A base structure for storing a collection of XML documents stored in aggregate storage form ("aggregate form") may be, for example, a collection of XML documents stored in a LOB table.

Aggregate storage is useful for storing complex data because it can be used to store data regardless of format and/or schema. For instance, when adding an XML resume to a LOB-based table, the resume is stored as one large chunk of data without performing any parsing or shredding of the content. Tables using LOB-based storage to store complex data typically contain very few actual values extracted from the complex data. Instead, the tables consist of references to the aggregate storage locations. In the resume example, when a new resume is added to LOB-based storage, a row is added to a resume table and includes a reference to point to the aggregate storage location where the new resume was stored.

These aggregate storage techniques avoid the overhead associated with analyzing, parsing, and shredding documents. Moreover, they help save storage space, since LOB-based storage makes better use of the underlying storage. In this way, they behave differently than object-relationally stored data.

The main drawback to aggregate storage techniques is that queries on the data are much more inefficient, time consuming, and resource intensive than object-relational techniques. Part of the reason for that is that the mechanisms that enhance access to object-relationally stored data are unavailable for XML type data stored in aggregate form. Other forms of storage, such as serialized tree storage, object storage, have the same problem.

II. Queries on Complex Data

Once complex data, such as an XML document, has been stored in a DBMS, the stored data may be queried. For example, given the object-relational database illustrated in Tables 1 and 2, a user may issue the following XMLTable SQL query (Query 1) to find out what the customer has ordered in purchaseOrder 100.

| Query Example 1 |
|---|
| select v.ItemNo, v.ItemName, v.ItemUnitPrice<br>from purchaseOrder, XMLTable('//lineItem' passing object_value<br>    Columns<br>        ItemNo number path '@itemNo',<br>        ItemName varchar2(40) path 'itemName',<br>        ItemQuantity number path 'itemQuantity',<br>        ItemUnitPrice number path 'itemUnitPrice') v |

| Query Example 1 |
|---|
| -continued |
| where v.itemQuantity = 3 and (v.itemName like 'C%' or v.itemName like 'M%'); |

The query is designed to return the ItemNo, ItemName, and ItemUnitPrice of any row that meets the conditions set out in the last line of the query (e.g., that has an itemQuantity equal to 3 and that starts with "C" or "M"). Query Example 1 returns the results table illustrated in Table 3:

TABLE 3

| Results of Query | | |
|---|---|---|
| ItemNo | ItemName | ItemUnitPrice |
| 34 | CPU | 123.45 |
| 68 | Memory | 23.45 |

Query Example 1 is executed efficiently because each of the values for ItemNo, ItemName, and ItemUnitPrice is stored in its own separate column in the purchaseOrder table. Performing the query involves the DBMS walking through each specified column to find the requested results. It should be noted that since there is a nested storage table for lineItems in Table 1, the DBMS follows the listed links to extract the values for the itemNo, itemName, and itemUnitPrice.

The XML purchaseOrder document 100 is stored object-relationally, so the entire realm of relational indexing technology and query optimization becomes directly applicable for XML operations. For example, relational-style B-Tree and bitmap indexes can be created on the relational columns.

Now consider what happens when XML is stored in aggregate form. If a similar query was executed on a table referencing aggregate storage, the DBMS would access the purchaseOrder table, find a reference to the aggregate storage location where purchaseOrder 100 is stored, access the aggregate storage location, and analyze the entirety of the stored data to see if the purchaseOrder has an ItemNo, ItemName, and ItemUnitPrice that meet the specified parameters of the query. For a large collection of XML documents stored this way, this process is very inefficient. The query analyzes the whole document rather than just the relevant pieces of information.

In some instances, XML indexes have been developed to improve query performance on data stored on aggregate form or other forms such as tree storage. These indexes use some variations of name-value pair storage model.

Briefly, a typical name-value pair index is organized as a physical path table containing rows corresponding to elements in the indexed documents. Each row of the path table consists of a document identifier, an order key that represents the hierarchical position of the node within the document, a path identifier corresponding to the named path from the root to the element, along with the element value. Table 4 below illustrates a typical index path table for purchaseOrder 100.

TABLE 4

Path Table for PurchaseOrder

| Doc ID | Path Identifier | Element Value | Order Key | |
|---|---|---|---|---|
| Rid1 | /PurchaseOrder/ShipAddrCity | Oakland | 1.2 | Ptr to LOB fragment |
| Rid1 | /PurchaseOrder/BillAddrCity | Berkeley | 1.3 | Ptr to LOB fragment |
| Rid1 | /PurchaseOrder/lineItem | | 1.4 | Ptr to LOB fragment |
| Rid1 | /PurchaseOrder/lineItem/@itemNo | 34 | 1.4.1 | Ptr to LOB fragment |
| Rid1 | /PurchaseOrder/lineItem/itemName | CPU | 1.4.2 | Ptr to LOB fragment |
| Rid1 | /PurchaseOrder/lineItem/itemQuantity | 3 | 1.4.3 | Ptr to LOB fragment |
| Rid1 | /PurchaseOrder/lineItem/itemUnitPrice | 123.45 | 1.4.4 | Ptr to LOB fragment |
| Rid1 | /PurchaseOrder/lineItem | | 1.5 | Ptr to LOB fragment |
| Rid1 | /PurchaseOrder/lineItem/@itemNo | 68 | 1.5.1 | Ptr to LOB fragment |
| Rid1 | /PurchaseOrder/lineItem/itemName | Memory | 1.5.2 | Ptr to LOB fragment |
| Rid1 | /PurchaseOrder/lineItem/itemQuantity | 3 | 1.5.3 | Ptr to LOB fragment |
| Rid1 | /PurchaseOrder/lineItem/itemUnitPrice | 23.45 | 1.5.4 | Ptr to LOB fragment |
| Rid2 | ... | | ... | ... |

As seen in the above layout of the path table, all of the elements of stored XML documents (e.g., the scalar values from XML documents, such as itemNo, itemName, itemQuantity, and itemUnitPrice) are stored horizontally as rows. To run a query like Query Example 1, the index is probed to see if it contains the requested scalar values. This query process is more efficient than the brute force technique described above; however, to find the requested values a massive number of rows may need to be scanned. These rows illustrated in Table 4 may index many elements not pertinent to evaluating a query. As a result, a massive amount of irrelevant data is scanned. Thus, even if, a XML index path table is used, the resulting index still suffers from the inefficiency of indexing a lot of rows for irrelevant data.

Thus, there is a need in the art for a solution to efficiently answer XML table queries regardless of the underlying storage technique.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a depiction of an XML document;

FIG. 4 is example XML data that includes different names for logically equivalent elements, according to an embodiment of the invention;

FIG. 5 is example XML data that includes a listing of the same sub-element within an element, according to an embodiment of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are described herein to create XML table indexes. An XML table index is an index that includes a table that indexes a collection of XML documents. An XML table index may itself be indexed by secondary indexes (e.g., B-tree index). In one embodiment, an XML table index is created for XML documents stored in aggregate storage. The XML table indexes project out data from a collection of XML documents into column form instead of row form. For example, rather than storing values for several different elements in the same column, but in separate rows (e.g., as an XML index path table), an XML table index stores values in separate columns, one for each element, with fewer rows. By projecting the data into column form, the query techniques used for optimizing access to object-relationally stored XML type data may also be used, to a degree, for XML type data stored in aggregate form. Moreover, by generating an XML table index, the techniques avoid the overhead of shredding the XML documents into object-relational format and the need for a well-defined XML schema. The XML data remains in aggregate form, but with the creation of XML table indexes, queries for frequently requested data run more efficiently. Thus, the techniques described herein apply principles of object-relational storage to XML documents stored in aggregate storage.

XML Table Index

In one embodiment, an XML table index is built, for example, over XML type data stored in aggregate form. Alternatively, the XML table index may improve the performance of even XML type data stored object-relationally. In one embodiment, an XML table index is a relational table index that results from extracting data from a common set of elements in the XML type data.

I. XML Table Index Creation

When new XML documents are added to an XML type table, required nodes from the XML documents are extracted and stored in an XML table index. According to one embodiment, when an XML document is added to the repository of XML documents, the new XML document is parsed to identify the common elements and nodes contained therein. Once the those nodes within the new XML document have been identified, the database server determines which of the values of the nodes contained in the XML document are to be indexed in the XML table index. The database server then updates the XML table index with the extracted values.

Figure 2:
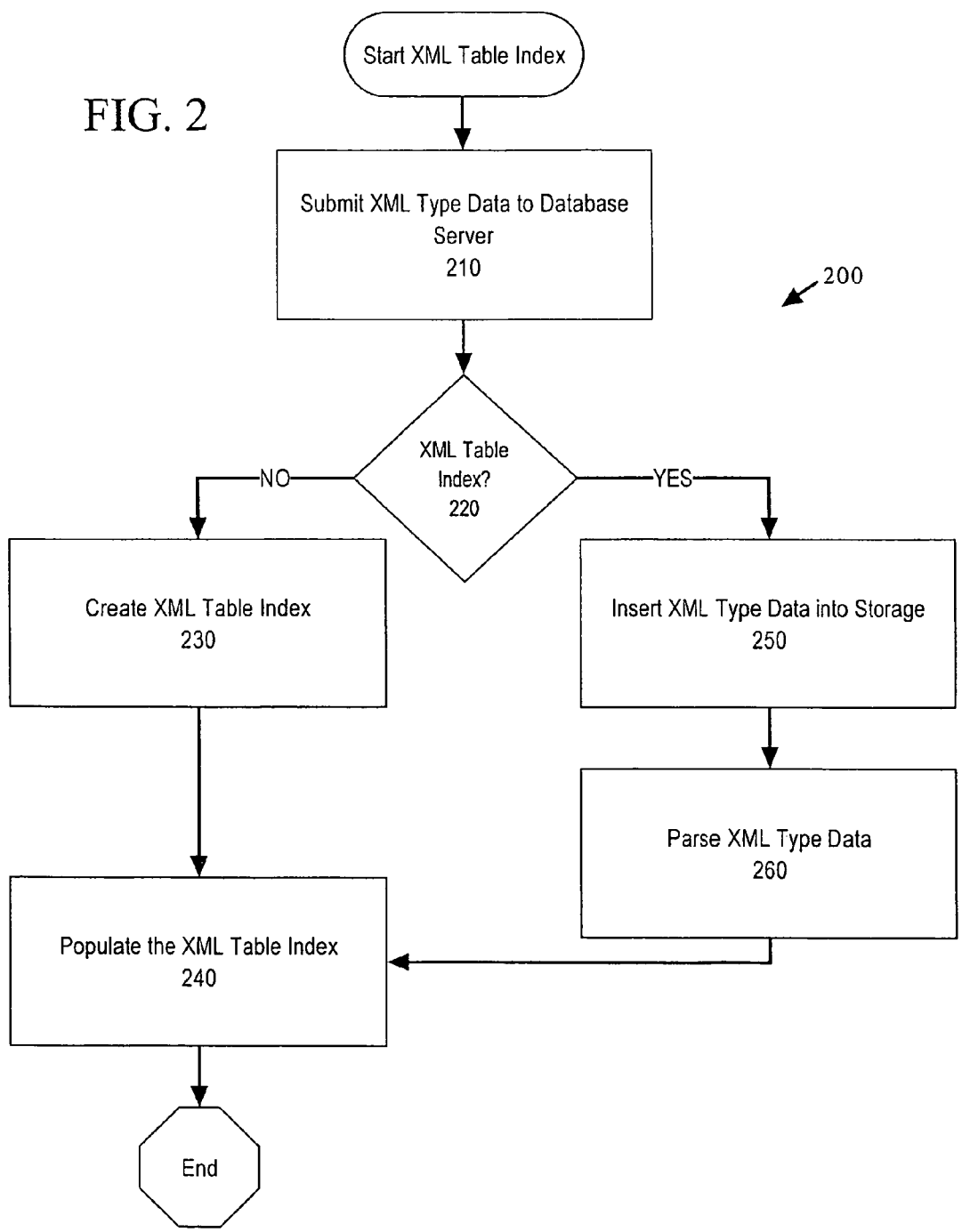
FIG. 2 is a flowchart illustrating steps performed to create an XML table index, according to an embodiment of the invention.

Referring to FIG. 2, it is a flowchart illustrating a procedure for processing new XML documents. According to one embodiment of the invention, the procedure is illustrated using purchaseOrder document 100. At step 210, a user submits an XML document to be stored in a repository on a database server.

At step 220, the database server determines whether there is an existing XML table index for the type of XML document submitted. If there is not, in one embodiment, the database server creates the XML table index for the XML document 230. Creating the XML table index may be done automatically, based on a first submitted template document. Alternatively, the XML table index is defined by a user through a set of Data Definition Language ("DDL") commands before any data has been submitted.

Ultimately, at step 230, the XML table index is created by specifying row and column patterns for the index. The patterns to be indexed may include nodes, values, attributes, elements, processing instructions, or even expressions (e.g., price_per_order*numorders). In one embodiment, the columns for the XML table index are created based on nodes or values extracted from the submitted XML document. In one embodiment, the extracted elements are elements common to similar documents. For example, resumes submitted to a database server generally include metadata such as the name of the applicant, their home address, email address, and work experience. Since these elements are common to virtually every resume, an XML table index may be created with a name column, an address column, an email address column, and a work experience column. Obviously, which elements are used in the XML table index varies based on the type of document being submitted, the types of queries to be performed, database server resources, etc. Moreover, the nodes or values do not need to exist in every document, for example, there can be nodes or values with empty or null values in the resulting XML table index.

To further illustrate, consider purchaseOrder document 100 submitted at step 210. In one embodiment, purchaseOrder document 100 is inserted into a repository that makes use of aggregate storage techniques (or, it is inserted subsequent to or concurrently with the creation of the XML table index). To generate the XML table index for purchaseOrder document 100, a create index command is executed. An example create command is illustrated below (Create Command 1).

---

Create Command 1

CREATE INDEX POIndex ON PurchaseOrder(object_value)
IndexType is XDB.XMLTableIndex
PARAMETERS('XMLTABLE PO_INDEX_TAB "//lineItem"
    Columns   ItemNo number path '@itemNo',
                  ItemName varchar2(40) path 'itemName',
                  ItemQuantity number path 'itemQuantity',
                  ItemUnitPrice number path 'itemUnitPrice');

---

Create Command 1 creates an XML table index based on the information received in purchaseOrder document 100. In this scenario, it has been determined that ItemNo, ItemName, ItemQuantity, and ItemUnitPrice are elements common to most purchaseOrders documents. Accordingly, the XML table index is created with columns for each of those elements. In alternative embodiments, a different set of elements may be used to define the columns in the XML table index.

At step 240, when the create command is executed, the database server internally creates table PO_INDEX_TAB, illustrated below in Table 5, and populates it with values extracted from purchaseOrder document 100.

TABLE 5

PO_INDEX_TAB

| RowId | ItemNo | ItemName | ItemQuantity | ItemUnitPrice |
|---|---|---|---|---|
| Rid1 | 34 | CPU | 3 | 123.45 |
| Rid1 | 68 | Memory | 3 | 23.45 |
| Rid2 | ... | ... | ... | ... |

In one embodiment, PO_INDEX_TAB is an object-relational table, which may be queried using object-relational techniques.

Returning to step 220, assume an XML document is submitted after an XML table index has been created. At step 250, the new XML document is inserted into aggregate storage and a reference to the aggregate storage location is made in the corresponding XML type table. At step 260, the new XML document is parsed into its separate elements. At step 240, a new row is created in the XML table index and values from the new XML document are inserted into their corresponding columns.

The amount of data in the XML table index varies based on the type of information being stored, the types of queries that are likely to be made, the expected size of elements from a document, and a wide range of other factors.

In one embodiment, during the creation of the XML table index, a primary key and foreign key relationship is created so that result sets from the XML table index may be joined with the purchaseOrder table after a query. Moreover, in one embodiment, the RowId serves an identifier to identify the row in the XML type index with which rows in the XML table index are associated.

II. Query Rewrite Leveraging XML Table Index

After an XML table index has been created and populated, it can be used to speed up the queries on collections of XML documents stored in aggregate form. Consequently, when a query is submitted on the collections of XML documents, a database server may leverage the XML table index to find results more quickly. For example, according to one embodiment, when a query is submitted on a collection of XML documents, the database server checks to see whether there is an existing XML table index for the XML type data and whether the XML table index has values that satisfy the requested query conditions. If the XML table index includes columns with values that satisfy the query, the original query is internally rewritten to take advantage of the XML table index. Then, the new query is executed on the XML table index.

As mentioned above, creating the XML table index places commonly sought scalar values from the XML type data into a relational table. When the user queries for the values, the database server first checks the XML table index to see if the value is stored there before accessing other indexes and tables. For example, a typical search query on a XML type table of resumes may include a request for everyone living in a particular city. Assuming the XML table index has a city column, the query is performed on the XML table index. In this way, in one embodiment, the request is answered without ever consulting the underlying XML type table.

Queries for less frequently sought after data may still make use of other types of indexes and tables (e.g., XPath tables and value indexes), or they may simply perform full text searches on the base database structures. A simple illustration involves resumes submitted to a computer software manufacturer. Suppose a qualified applicant includes the fact that he is a scratch golfer on his resume. Golfing ability is typically not a necessary requirement to work at a computer software manufacturer. So, when designing the XML table indexes, a column was not created for golfing ability. However, at one point, the president of the company decides she wants to create good publicity for their company by entering employees in charity golf tournaments. A query is made to find qualified individuals who are also golfers. In one embodiment, since golfing ability is a less frequently sought piece of data, it would not be found in the XML table index associated with the resumes. Note that since this query is performed infrequently, the overall performance of the database server is rarely impacted In one embodiment, the database server performs statistical analysis and/or keeps track of queries submitted to access nodes to determine if additional nodes or values should be added or removed from the XML table index. For example, in the above scenario, assume that golfing ability becomes a standard part of queries used to access user resumes. The database server detects that fact and, in one embodiment, automatically adds a column to the XML table index to maintain a user's golfing ability. Similarly, if at some point, golfing ability may stop being a queried value, the database server may automatically remove that column from the XML table index.

Figure 3:
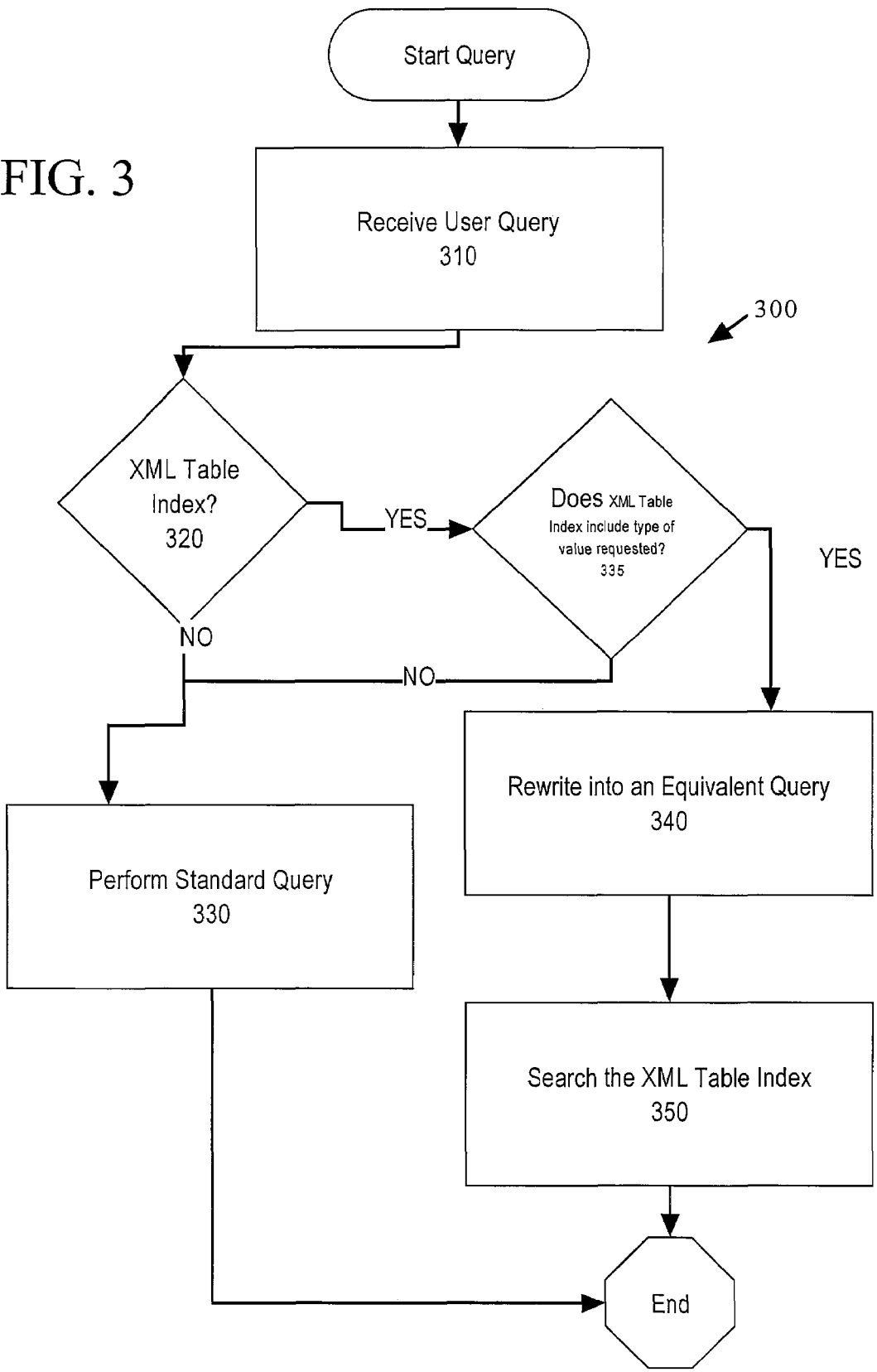
FIG. 3 is a flowchart illustrating steps performed to query an XML table index, according to an embodiment of the invention.

Referring to FIG. 3, it is a flowchart illustrating how queries on an XML type table are processed leveraging XML table indexes. At step 310, a user submits a query to the database server. In one embodiment, the query is Query Example 1 described above in connection with purchaseOrder document 100 and reproduced here:

---

Query Example 1 select v.ItemNo, v.ItemName, v.ItemUnitPrice
from purchaseOrder, XML Table('//lineItem' passing object_value
    Columns
        ItemNo number path '@itemNo',
        ItemName varchar2(40) path 'itemName',
        ItemQuantity number path 'itemQuantity',
        ItemUnitPrice number path 'itemUnitPrice') v
where v.itemQuantity = 3 and (v.itemName like 'C%' or v.itemName like 'M%');

---

At step 320, the database server determines whether there is an existing XML table index associated with purchaseOrders. If there is not, at step 330, the database server proceeds to perform the query using other querying techniques.

In one embodiment, assume, at step 320, the XML table index, PO_INDEX_TAB illustrated above in Table 5, has been created for the XML type table being queried. At step 335, the database server performs a check to see if the XML table index includes the types of values being requested in the query. For example, in connection with Query Example 1, the database server checks to see if PO_INDEX_TAB includes columns that can meet the conditions requested in the predicate statement, namely, whether the PO_INDEX_TAB includes an itemQuantity and itemName column. If, at step 335, the XML table index cannot meet the conditions of the query, at step 330 the database server performs the query using a different querying technique.

If, however, PO_INDEX_TAB has searchable columns itemQuantity and itemName, in one embodiment, at step 335, the query is filed on PO_INDEX_TAB.

Accordingly, at step 340, in one embodiment, the query is rewritten to leverage the presence of the XML table index. Rewriting the query involves internally translating the query to access the XML table index in lieu of the original XML type table. For example, Query Example 1 is issued on the purchaseOrder XML type table. However, PO_INDEX_TAB can be used to fulfill the query. Therefore, Query Example 1 is rewritten to access PO_INDEX_TAB instead. Basically, Query Example 1 is translated into another equivalent query that produces the same results, yet, at a significant improvement in performance.

In one embodiment, Query Example 1 is automatically rewritten to leverage the XML table index. Query Example 2 is an example rewritten query for Query Example 1. Query Example 2 leverages the object-relational aspects of PO_INDEX_TAB.

---
Query Example 2

```
select v.ItemNo, v.ItemName, v.ItemUnitPrice
from purchaseOrder, LATERAL(
        select ItemNo, ItemName, ItemQuantity, ItemUnitPrice
        from PO_INDEX_TAB t
        where t.rowid = purchaserOrder.rowid) v
where v.itemQuantity = 3 and (v.itemName like 'C%' or v.itemName
like 'M%');
```
---

In one embodiment, translating Query Example 1 into Query Example 2 occurs internally on the database server. In one embodiment, the translating process is a mapping process. In Query Example 1, the call to the XML type table is substituted with a call to a temporary table called "LATERAL". The LATERAL label is an internal representation that redirects the query to the PO_INDEX_TAB. From there a view of the requested data is generated. The original predicate conditions are then applied to the generated view.

According to another embodiment, Query Example 2 may be further optimized via traditional view merge techniques. For example, the LATERAL label is internally merged before it is executed. In this example, the database server performs a join operation on the purchaseOrder XML type table with the PO_INDEX_TAB eliminating non-essential information from the query. The following query, Query Example 3, is the optimized version of Query Example 1:

---
Query Example 3

```
select v.ItemNo, v.ItemName, v.ItemUnitPrice
    from purchaseOrder, PO_INDEX_TAB v
    where v.rowid = purchaserOrder.rowid and v.itemQuantity = 3 and
    (v.itemName like 'C%' or v.itemName like 'M%');
```
---

Query Example 3 is executed efficiently. Instead of querying the XML type table, the rewritten and optimized query is rewritten to access PO_INDEX_TAB. In both Query Examples 2 and 3, it should be noted that the predicate conditions remain constant (e.g., itemQuantity equals three and itemName starts with "C" or "M"). The rewritten queries produce results equivalent to those that would have been returned if the original query had been made. Query Examples 2 and 3, however, produce the results much faster.

In some embodiments, the XML table index improves the performance of queries even if they are not directed to XML type tables using aggregate storage. For example, consider the following query, Query Example 4, which is executed on a relational table:

---
Query Example 4

```
select object_value
from purchaseOrder
where existsNode(object_value, '//lineItem [itemQuantity >= 3 and
itemName like 'C%']') = 1
```
---

In this example, a purchaseOrder document has been stored in object-relation storage. The user wants to find all the purchaseOrders where the name for a purchased item starts with "C" and 3 or more of those items were purchased. Assume that the purchaseOrder schema is large. Accordingly, an XML table index of the most commonly searched elements may be created to improve performance even on a relational table. For example, if common search elements include itemQuantity and itemName, an XML table index may be created with columns for those two elements. Then when Query Example 4 is filed on the purchaseOrder XML table (stored object-relationally), it may be rewritten to leverage the XML table index.

In one embodiment, Query Example 4 is rewritten as Query Example 5 illustrated below:

---
Query Example 5

```
select object_value
from purchaseOrder
where exists(select null
        from PO_INDEX_TAB v
        Where v.rowid = purchaserOrder.rowid
        And v.itemQuantity >= 3 and v. itemName like 'C%');
```
---

If Query Example 4 includes columns defined in a corresponding XML table index, in one embodiment, then Query Example 5 may be made directly on the XML table index. The query returns rows from the XML table index that meet the predicate conditions and those results are joined with the purchaseOrder table. The joined information is presented to the user. Thus, an XML table index may improve query performance on object-relational tables as well as XML type tables that incorporate aggregate storage techniques.

III. Other Features of XML Table Index

A. Flexible Row Pattern and Column Path Alias in XML Table Index

As discussed above, XML type documents are often semi-structured, meaning two documents inserted in the same database may have different formats. In one embodiment, some XML documents use different terms to describe similar concepts. For instance, a purchaseOrder document may use the element "itemNo" to identify the number of items a user purchases. Another document may use a different element name such as "itemNumber" to describe the same thing. In other words, the two elements are logically the same, but have different names. When creating an XML table index, in one embodiment, the database server provides a means to account for different terminology used from one document to the next.

In one embodiment, aliases are created for row patterns and column patterns that are logically the same. An alias maps multiple elements into a single construct. The aliases themselves may be maintained globally or otherwise. In one embodiment, the internal structure of the XML table index remains the same when using aliases.

Referring to FIG. 4, it illustrates an XML document 400 similar to purchaseOrder document 100 in FIG. 1 with some additional XML data 410. The additional XML data 410 defines a new row pattern called "newLineItem" and within that row pattern are various column patterns called "item/name", "quantity", "fprice/uprice" (full price/unit price), and "fprice/tprice" (full price/total price). In this example, item/name is logically equivalent to itemName, quantity is logically equivalent to itemQuantity, and fprice/uprice is logically equivalent to itemUnitPrice.

In one embodiment, aliases are used to indicate the logical equivalence of the item/name to itemName, quantity to itemQuantity, etc. Accordingly, an XML table index is created to capture all the possible column path aliases. The instructions to create XML table index aliases are illustrated in Create Command 2. As illustrated, a row pattern alias is shown as the union of two XPaths. In alternative embodiments, a mapping function may illustrate the logical equivalence of two row patterns.

---

Create Command 2

---

CREATE INDEX POIndex ON PurchaseOrder(object_value)
IndexType is XDB.XMLTableIndex
PARAMETERS('XMLTABLE ALIAS_PO_INDEX_TAB "//lineItem | //newLineItem" /* row pattern */
/* column pattern */
Columns    ItemNo number path '@itemNo',
          ItemName varchar2(40) path 'itemName' alias 'item/name',
          ItemQuantity number path 'itemQuantity' alias 'quantity',
          ItemUnitPrice number path 'itemUnitPrice' alias
          'fprice/uprice');

---

Create Command 2 creates a new XML table index, ALIAS_PO_INDEX_TAB that stores both lineItems and newLineItems, as if they were logical equivalents by using a union function. In addition, Create Command 2 defines various aliases for column patterns in the XML table index. For example, ALIAS_PO_INDEX_TAB is created with an alias for item/name (e.g., ItemName), quantity (e.g., ItemQuantity), and fprice/uprice (e.g., ItemUnitPrice). Then, in one embodiment, when an XML document is shredded into its basic elements, if one of those elements is an item/name, it is placed in the ItemName column of the row for that particular purchaseOrder. Similarly, if the shredded document included a quantity, the quantity value would be placed in the ItemQuantity column for that particular document, etc. After values from the shredded document have been placed in their appropriate column, queries specifying only an ItemName return all the proper results whether a value was originally listed as an itemName or item/name.

In one embodiment, there may be multiple aliases for a row or column. For example, in addition to itemName and item/name, additional aliases, such as iName, I_Name, Name, purchasedName, Unit_Name, etc., may be mapped to the ItemName column.

Referring again to FIG. 4, assume the ALIAS_PO_INDEX_TAB has been created for the document 410. Suppose a user wants to submit a query to find all purchaseOrders where the items ordered were in quantities greater than 2 and the price for each item ordered is greater than 23.35.

The following query, Query Example 6, leverages the XML table index:

---

Query Example 6 select object_value
    from purchaseOrder
    where existsNode(object_value, '//lineItem |
    newLineItem([itemQuantity >=3 or quantity >= 3) and
    (itemUnitPrice > 23.35 or fullprice/uprice > 23.35) ]') = 1

---

In this query, the user explicitly specifies the aliases. In alternative embodiments, the user performs the query specifying only one row pattern or alias name.

B. XML Table Index Partition

In one embodiment, an XML table index can be partitioned independently of the underlying base table. By partitioning the XML table index, a user creates smaller indexes to be searched. Consider for example the XML table index created for purchaseOrder document 100. As new documents are added to the purchaseOrder database, the XML table index grows in size. At some point, it may make sense to partition the XML table index into two smaller indexes keyed on a specific column value. For example, in one embodiment, the user partitions the XML table index after 10,000 entries have been made. The XML table index is partitioned into rows containing itemNos with a value greater than 1000 and those rows having a itemNos with a value less than or equal to 1000. Partitioning an XML table index, in one embodiment, allows basic predicate pruning to be performed as soon as a query is submitted. For instance, when a database server receives a query, it checks to see if there is an XML table index for the query as described above. If there are multiple XML table index partitions, then the database server eliminates those partitions that have values outside the scope of the queried value.

Moreover, in one embodiment, partitioning the XML table index provides the means to process multiple indexes in parallel.

According to one embodiment, XML table index partitions are created that divide the XML table index into separate tables based on the value of itemNo. The following sequence of instructions (Create Command 3) illustrates one way of creating XML table index partitions

---

Create Command 3

---

CREATE INDEX POIndex ON PurchaseOrder(object_value)
IndexType is XDB.XMLTableIndex
PARAMETERS('XMLTABLE PART_PO_INDEX_TAB "//lineItem | //newLineItem"
Columns    ItemNo number path '@itemNo',
          ItemName varchar2(40) path 'itemName' alias 'item/name',
          ItemQuantity number path 'itemQuantity' alias 'quantity',
          ItemUnitPrice number path 'itemUnitPrice' alias
          'fullprice/uprice'
Partition by Range ItemNo < 10000 partitionl, ItemNo between 10000 and 30000 partition2, ItemNo > 30000 partition3);

---

Create Command 3 creates an XML table index called PART_PO_INDEX_TAB with three separate partitions. The first partition maintains rows for lineItems with itemNo values less than 10,000. The second partitions stores rows for lineItems with itemNos between 10,000 and 30,000. And, the third partition stores rows with lineItems containing itemNo values over 30,000. After the partitions have been made and populated, a query is filed on purchaseOrders. Query Example 7 illustrates an example query for finding purchaseOrders that have orders for between 15,000 and 25,000 items.

---

Query Example 7 select object_value
    from purchaseOrder
    where existsNode(object_value, '//lineItem | //newLineItem
    [@itemNo > 15000 and @itemNo < 25000]') = 1

---

As indicated above, queries may be rewritten to leverage XML table indexes. In this case, Query Example 7 is internally rewritten to leverage not only the XML table indexes, but the partitions of the XML table index. Query 8 includes an example query rewritten to leverage the XML table index partitions.

| Query Example 8 |
|---|
| select object_value<br>from purchaseorder p<br>where exists (select null<br>        from po_index_tab_partition2 t<br>        where itemNo > 15000 and itemNo < 25000 and<br>        t.rowid = p.rowid) |

In this example, the query is automatically rewritten to search the second partition of PART_PO_INDEX_TAB because the second partition stores the values of itemNo between 15,000 and 25,000. Searching by partition reduces the number of rows and index values probed during the query.

In one embodiment, the XML table index is partitioned, but the underlying data is not. Alternatively, the XMLTable index may also be partitioned with the base table. For example, if the base table is partitioned into 3 partitions, the XML table index is partitioned into 3 corresponding partitions.

C. Constraints on an XML Table Index

In one embodiment in which the XML Table index is a relational table, relational constraints and indexes may be created on the XML table index to speed up queries. For example, in one embodiment, primary key and foreign key constraints may be created and enforced on the XML table index, such as all itemNos should be unique. As another example, a B-tree index for the XML table index may be created to further improve query performance.

D. XML Table Index and XML Table Chaining

In one embodiment, XML table indexes are created in chained fashion to enhance the hierarchical navigation of XML type data. For example, an XML type table may have multiple XML table indexes that each covers separate elements of the XML type data. Alternatively, the XML table indexes may include references to internal tables that cover separate elements and nodes within the XML type data. Accordingly, in one embodiment, a single query may be written to search multiple XML tables and return a single result set extracted from the disparate XML table indexes.

For example, in one embodiment, a new sub-element called DetailsCmt (detailed comments) is added to the purchaseOrder document 100 in FIG. 1. FIG. 5 illustrates the new purchaseOrder document 500 including DetailsCmts 510 and 520. In one embodiment, the detailed comments 510 and 520 store important information relating to the nature of a purchaseOrder transaction. For instance, they may indicate who made the transaction, shipping requirements (e.g., whether to use overnight delivery), delivery times, alternate delivery address, and other information related to a purchaseOrder. In one embodiment, each listed DetailsCmt is part of a larger overall comment for the purchaseOrder document. Therefore, before shipping any items, a user runs a query to see if there are any comments that need to be taken into consideration before shipping items listed in a purchaseOrder.

As before, a purchaseOrder may be stored object-relationally, or in some other form. If the purchaseOrders are stored object-relationally, the purchaseOrder table makes reference to a lineItem table. The lineItem table in turn makes reference to a table of DetailsCmts. Accordingly, in one embodiment, a purchaseOrder has a list of lineItems, and each lineItem has a list of DetailCmts.

Under conventional query techniques, a query such as Query Example 9 is executed to return all the detailed comments for those purchaseOrder documents that satisfy the listed predicate conditions.

| Query Example 9 |
|---|
| select v.ItemNo, v.ItemName, v.ItemUnitPrice, v2.Cmt<br>from purchaseOrder, XMLTable('//lineItem' passing object_value<br>    Columns<br>        ItemNo number path '@itemNo',<br>        ItemName varchar2(40) path 'itemName',<br>        ItemQuantity number path 'itemQuantity',<br>        ItemUnitPrice number path 'itemUnitPrice',<br>        DetailsCmt xmltype path 'DetailsCmt') v,<br>    XMLTable('/DetailsCmt' passing v.DetailsCmt<br>    Columns<br>        Cmt varchar2(40) path 'text( )') v2<br>where v.itemQuantity = 3 and (v.itemName like 'C%' or v.itemName like 'M%'); |

In this example, the query performs an exhaustive search on the XML data and eventually returns among other things the detailed comments for those purchaseOrders with itemQuantity equal to three and itemName starting with either a "C" or an "M".

To speed up the above-listed query, in one embodiment, an XML table index internally chains tables together. For example, the PO_INDEX_TAB maintains a list of lineItems. Each lineItem in turn references a list of DetailsCmt. The list within a list creates a chain of data that helps overcome storage and access issues. A database server may internally chain multiple tables together to handle the overflow of information. In one embodiment, when values are extracted from XML type data, chained tables for an XML table index are created so that there is a primary and foreign key join between them.

Create command 4 illustrates an example set of instructions to create an XML table index that includes a reference to another table. As illustrated, a table is created for the lineItem data and within that table a reference is made to another table of DetailsCmt.

| Create Command 4 |
|---|
| CREAT INDEX POIndex ON PurchaseOrder(object_value)<br>IndexType is XDB.XMLTableIndex<br>PARAMETERS('XMLTABLE PO_INDEX_TAB "//lineItem"<br>    Columns    ItemNo number path '@itemNo',<br>                     ItemName varchar2(40) path 'itemName',<br>                     ItemQuantity number path 'itemQuantity',<br>                     ItemUnitPrice number path 'itemUnitPrice',<br>        XMLTABLE PO_INDEX_TAB2 '/DetailsCmt'<br>    Columns<br>                     Cmt varchar2(40) path 'text( )'); |

Create Command 4 internally generates two tables PO_INDEX_TAB and PO_INDEX_TAB2 with an internally generated PO_INDEX_TAB.SID column to be joined with an internally generated PO_INDEX_TAB2.PID column. The SID and PID are identifiers automatically generated by the database server to uniquely identify a row in a table. In one embodiment, when the SID and PID are the same, it indicates that the itemNo, itemName, itemQuantity, itemUnitPrice and the DetailsCmt came from the same lineItem.

Once the XML table index has been created with the linked tables, a user may create a query on the index that accesses the chained table to get a specific result set. For example, Query Example 10 illustrates a query that returns the result set described above from chained PO_INDEX_TAB and PO_INDEX_TAB2.

Query Example 10 select v.ItemNo, v.ItemName, v.ItemUnitPrice, v2.Cmt
from purchaseOrder, PO_INDEX_TAB v, PO_INDEX_TAB2 v2
where v.itemQuantity = 3 and (v.itemName like 'C%' or v.itemName like 'M%') and purchaseOrder.rowid = v.rowid and v.sid = v2.pid;

Query Example 10 returns a result set generated from PO_INDEX_TAB and a different result set generated from PO_INDEX_TAB2. Those two result sets are joined together. The resulting view shows all the ItemNo, ItemName, ItemUnitPrice, and Cmts from lineItems having the defined predicate conditions.

Create Command 5

CREATE INDEX POIndex ON PurchaseOrder(object value)
IndexType is XDB.XMLTableIndex
PARAMETERS('XMLTABLE PO_INDEX_TAB '//lineItem'
Columns    ItemNo number path '@itemNo',
           ItemName varchar2(40) path 'itemName',
           ItemQuantity number path 'itemQuantity',
           ItemUnitPrice number path 'itemUnitPrice',
           ItemDetails xmltype path 'DetailsCmt');

In one embodiment, Create Command 5 internally creates a table PO_INDEX_TAB with the following content:

TABLE 6

| RowId | ItemNo | ItemName | ItemQuantity | ItemUnitPrice | ItemDetails |
|-------|--------|----------|--------------|---------------|-------------|
| Rid1  | 34     | CPU      | 3            | 123.45        | LOB ptr     |
| Rid1  | 68     | Memory   | 3            | 23.45         | LOB ptr     |
| Rid2  | ...    | ...      | ...          | ...           | ...         |

E. XML Type and Non-Scalar Type Columns in XML Table Index

In one embodiment, the columns in an XML table index are not all relational scalar columns. For example, the columns in the XML table index may include lists, arrays, references to other tables and virtually any other type of data that is supported by the database server.

In one embodiment, the XML table index can store hierarchical order information in a column. According to one embodiment, the hierarchical order information is represented using a Dewey-type value called an OrderKey. In one embodiment, the OrderKey of a node is created by appending a value to the OrderKey of the node's immediate parent, where the appended value indicates the position, among the children of the parent node, of that particular child node. For example, assume that a particular node D is the child of a node C, which itself is a child of a node B that is a child of a node A. Assume further that node D has the OrderKey 1.2.4.3. The final "3" in the OrderKey indicates that the node D is the third child of its parent node C. Similarly, the 4 indicates that node C is the fourth child of node B. The 2 indicates that Node B is the second child of node A. The leading 1 indicates that node A is the root node (i.e. has no parent).

Furthermore, in one embodiment, XML table indexes can have columns of XML type data. For example, a user designs a resume repository and stores the applicant's working experience in aggregate storage. In such a case, the XML table index for the resume repository includes a column that instead of containing the entire work history, includes a reference to the aggregate storage where the work history is stored. When queried, the XML table index locates the reference, looks up the referred aggregate storage where the work history is stored, and returns the text. In one embodiment, the text is returned without looking at the particular details in the work history.

Consider the purchaseOrder example. In one embodiment, a user may create an XML Table Index to store all DetailsCmt as XML type data. Create Command 5 illustrates an example set of instruction to do so:

In table 6, the ItemDetails column points to the location where the detailed comments are stored. When queried the entire text stored in aggregate storage is returned.

In one embodiment, queries rewritten to leverage XML table indexes may simultaneously include aliasing techniques, partitioning techniques, chaining, and/or XML type data.

IV. Hardware Overview

Figure 6:
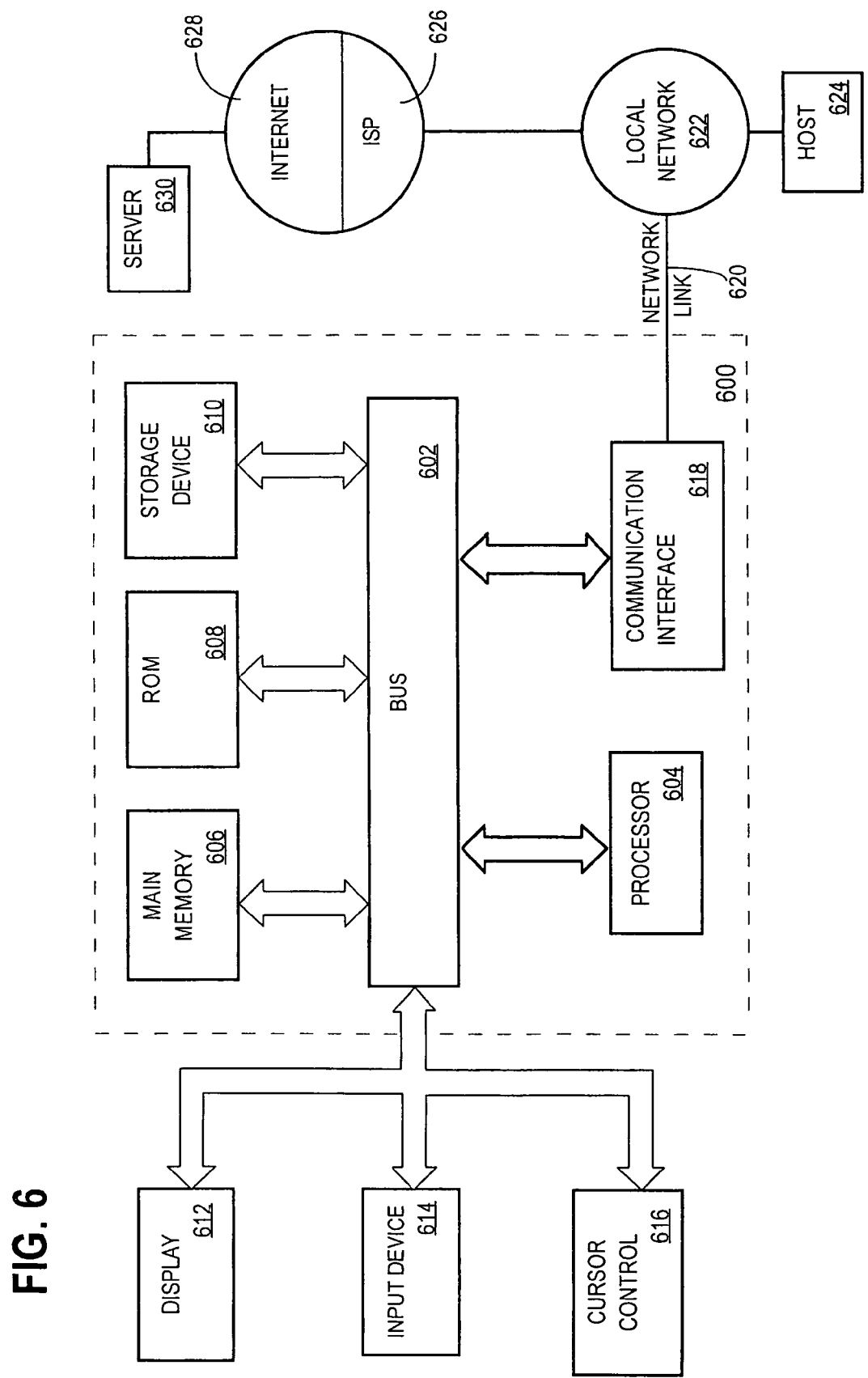
FIG. 6 is a block diagram of a computer system upon which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one implementation of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative implementations, hard-wired circuitry may be used in place of or in combination with software instructions to implement the invention. Thus, implementations of the invention are not limited to any specific combination of hardware circuitry and software.

The term "machine-readable medium" as used herein refers to any medium that participates in providing data that causes a machine to operation in a specific fashion. In an implementation implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, implementations of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for querying a durably stored collection of XML documents, the method comprising:

storing said collection of XML documents in one or more base database structures managed by a database system for storing said collection of XML documents;

wherein each XML document of said collection of XML documents is stored, within the one or more base database structures, in an unshredded form;

based on pattern data that indicates elements defined for a particular XML document type, creating a table for the particular XML document type separate from said one or more base database structures in which said collection of XML documents are stored;

wherein said table includes a plurality of columns;

wherein each column of said plurality of columns corresponds to a different element indicated in the pattern data;

wherein each column contains only values of the element of the XML document type to which the column corresponds;

wherein each row of said table corresponds to a corresponding XML document in said collection;

wherein each row of said table stores values for elements from the corresponding XML document;

wherein said pattern data indicates, for each column of said plurality of columns, the different element, of the particular XML document type, that corresponds to the column;

using said table to answer a first query requesting data from said collection of XML documents;

responding to said first query without accessing said one or more base database structures; and responding to a second query requesting data from said collection of XML documents by providing one or more unshredded XML documents from said one or more base database structures;

wherein said method is performed by one or more computing devices.

2. The method of claim 1, further comprising:

receiving a new XML document to store in said collection of XML documents;

extracting a new set of values from the new XML document, wherein each value in said set of new values corresponds to a different element indicated in the pattern data;

populating each column of said plurality of columns from said table with the new set of values extracted from the new XML document.

3. The method of claim 1, wherein the different element indicates at least one of nodes, elements, expressions, attributes, and values defined for said particular XML document type.

4. The method of claim 1, wherein the table is created by executing Data Definition Language instructions received from a user.

5. The method of claim 1, wherein the pattern data includes a first XML document template submitted to the database system.

6. The method of claim 2, wherein the new set of values extracted from the XML document includes XML type data.

7. The method of claim 1, wherein the new set of values extracted from the XML document corresponds to common search elements.

8. The method of claim 1, wherein the table includes one or more references to a set of additional tables, wherein the one or more references to the set of additional tables creates a table chain.

9. The method of claim 1, further comprising:
partitioning said table into one or more partitions.

10. The method of claim 9, wherein the partitioning includes executing the create command with one or more partitioning instructions.

11. The method of claim 9, wherein the partitioning corresponds to the partitioning of the one or more database structures.

12. The method of claim 2, wherein a column from said plurality of columns maps to two or more elements.

13. The method of claim 12, wherein a set of values corresponding to the two or more elements are stored in the column from said plurality of columns that maps to two or more elements.

14. The method of claim 1, further comprising creating a set of secondary indexes for the table.

15. The method of claim 1, wherein the table includes at least one column of said plurality of columns that stores node hierarchical order information.

16. The method of claim 1, further comprising:
intercepting a user-submitted query on the collection of XML documents;

rewriting the user-submitted query on the collection of XML documents to access the table.

17. The method of claim 1, further comprising:
intercepting a user-submitted query on the collection of XML documents;

rewriting the user-submitted query on the collection of XML documents to access the table.

18. The method of claim 17, wherein rewriting the user-submitted query includes mapping the user-submitted query to two or more partitions of the table.

19. The method of claim 16, further comprising:
analyzing the user-submitted query to determine a frequently accessed element from the collection of XML documents;

automatically adding a new column to the table for the frequently accessed element.

20. A machine-readable storage medium storing one or more sequences of instructions which, when executed by one or more processors, causes:

storing said collection of XML documents in one or more base database structures managed by a database system for storing said collection of XML documents;

wherein each XML document of said collection of XML documents is stored, within the one or more base database structures, in an unshredded form;

based on pattern data that indicates elements defined for a particular XML document type, creating a table for the particular XML document type separate from said one or more base database structures in which said collection of XML documents are stored;

wherein said table includes a plurality of columns;

wherein each column of said plurality of columns corresponds to a different element indicated in the pattern data;

wherein each column contains only values of the element of the XML document type to which the column corresponds;

wherein each row of said table corresponds to a corresponding XML document in said collection;

wherein each row of said table stores values for elements from the corresponding XML document;

wherein said pattern data indicates, for each column of said plurality of columns, the different element, of the particular XML document type, that corresponds to the column;

using said table to answer a first query requesting data from said collection of XML documents;

responding to said first query without accessing said one or more base database structures; and responding to a second query requesting data from said collection of XML documents by providing one or more unshredded XML documents from said one or more base database structures.

21. The machine-readable storage medium of claim 20, further comprising instructions which, when executed by one or more processors, causes:

receiving a new XML document to store in said collection of XML documents;

extracting a new set of values from the new XML document, wherein each value in said set of new values corresponds to a different element contained in said collection of XML documents;

populating each column of said plurality of columns from said tables with the new set of values extracted from the new XML document.

22. The machine-readable storage medium of claim 20, wherein the different element indicates at least one of nodes, elements, expressions, attributes, and values defined for said particular XML document type.

23. The machine-readable storage medium of claim 20, wherein the table is created by executing Data Definition Language instructions received from a user.

24. The machine-readable storage medium of claim 20, wherein the pattern data includes a first XML document template submitted to the database system.

25. The machine-readable storage medium of claim 21, wherein the new set of values extracted from the XML document includes XML type data.

26. The machine-readable storage medium of claim 20, wherein the new set of values extracted from the XML document corresponds to common search elements.

27. The machine-readable storage medium of claim 20, wherein the table includes one or more references to a set of additional tables, wherein the one or more references to the set of additional tables creates a chain.

28. The machine-readable storage medium of claim 20, further comprising instructions which, when executed by one or more processors, causes:
partitioning said table into one or more partitions.

29. The machine-readable storage medium of claim 28, wherein the partitioning includes executing the create command with one or more partitioning instructions.

30. The machine-readable storage medium of claim 28, wherein the partitioning corresponds to the partitioning of the one or more database structures.

31. The machine-readable storage medium of claim 21, wherein a column from said plurality of columns maps to two or more elements.

32. The machine-readable storage medium of claim 31, wherein a set of values corresponding to the two or more elements are stored in the column from said plurality of columns that maps to two or more elements.

33. The machine-readable storage medium of claim 20, further comprising instructions which, when executed by one or more processors, causes:
creating a set of secondary indexes for the table.

34. The machine-readable storage medium of claim 20, wherein the table includes at least one column of said plurality of columns that stores node hierarchical order information.

35. The machine-readable storage medium of claim 20, further comprising instructions which, when executed by one or more processors, causes:
intercepting a user-submitted query on the collection of XML documents;
rewriting the user-submitted query on the collection of XML documents to access the table.

36. The machine-readable storage medium of claim 21, further comprising instructions which, when executed by one or more processors, causes:
intercepting a user-submitted query on the collection of XML documents;
rewriting the user-submitted query on the collection of XML documents to access the table.

37. The machine-readable storage medium of claim 36, wherein rewriting the user-submitted query includes mapping the user-submitted query to two or more partitions of the table.

38. The machine-readable storage medium of claim 35, further comprising instructions which, when executed by one or more processors, causes:
analyzing the user-submitted query to determine a frequently accessed element from the collection of XML documents;
automatically adding a new column to the table for the frequently accessed element.

39. The method of claim 1, wherein the step of storing said collection of XML documents in one or more base database structures further comprises:
storing said collection of XML documents in a Large Binary Object (LOB) table managed by said database system for storing said collection of XML documents.

40. The machine-readable storage medium of claim 20, wherein the instructions for storing said collection of XML documents in one or more base database structures further comprises instructions which, when executed by one or more processors, causes:
storing said collection of XML documents in a Large Binary Object (LOB) table managed by said database system for storing said collection of XML documents.

41. The method of claim 1, wherein each row of said table includes a reference to a storage location within the one or more base database structures where the corresponding XML document is stored.

42. The machine-readable storage medium of claim 20, wherein each row of said table includes a reference to a storage location within the one or more base database structures where the corresponding XML document is stored.

* * * * *

UNITED STATES PATENT AND TRADEMARK OFFICE
CERTIFICATE OF CORRECTION

PATENT NO. : 7,644,066 B2  
APPLICATION NO. : 11/394878  
DATED : January 5, 2010  
INVENTOR(S) : Muralidhar Krishnaprasad et al.

It is certified that error appears in the above-identified patent and that said Letters Patent is hereby corrected as shown below:

In column 10, line 3, delete "impacted" and insert -- impacted. --, therefor.

In column 14, line 27, delete "partitions" and insert -- partitions. --, therefor.

In column 14, line 39, delete "partitionl," and insert -- partition1, --, therefor.

In column 15, line 63, delete "DetailCmts." and insert -- DetailsCmt. --, therefor.

In column 16, line 42, delete "CREAT" and insert -- CREATE --, therefor.

Signed and Sealed this

Fourteenth Day of September, 2010

David J. Kappos  
*Director of the United States Patent and Trademark Office*